(12) United States Patent
Nakanishi et al.

(10) Patent No.: US 8,475,722 B2
(45) Date of Patent: Jul. 2, 2013

(54) HYDROGEN GENERATION DEVICE AND METHOD OF USING SAME

(75) Inventors: Haruyuki Nakanishi, Susono (JP);
Norihiko Nakamura, Mishima (JP);
Hidekazu Arikawa, Susono (JP);
Hirofumi Fujiwara, Kariya (JP);
Hidehito Kubo, Kariya (JP); Keiji Toh, Kariya (JP); Akiko Kumano, Kariya (JP); Shohei Matsumoto, Kariya (JP)

(73) Assignees: Toyota Jidosha Kabushiki Kaisha, Toyota (JP); Kabushiki Kaisha Toyota Jidoshokki, Kariya (JP)

( * ) Notice: Subject to any disclaimer, the term of this patent is extended or adjusted under 35 U.S.C. 154(b) by 306 days.

(21) Appl. No.: 12/756,771

(22) Filed: Apr. 8, 2010

(65) Prior Publication Data

US 2011/0297531 A1 Dec. 8, 2011

(51) Int. Cl.
*B01J 19/08* (2006.01)
*B01J 19/12* (2006.01)
*C01B 3/04* (2006.01)

(52) U.S. Cl.
USPC ............ 422/186; 422/187; 204/157.52

(58) Field of Classification Search
USPC ............ 204/157.52; 422/186.3, 186, 187
See application file for complete search history.

(56) References Cited

U.S. PATENT DOCUMENTS

| 4,090,933 | A | * | 5/1978 | Nozik ............ 205/340 |
| 4,511,450 | A | * | 4/1985 | Neefe ............ 204/157.52 |
| 4,650,554 | A | * | 3/1987 | Gordon ............ 205/340 |
| 5,308,454 | A | * | 5/1994 | Anderson ............ 205/340 |
| 5,397,559 | A | * | 3/1995 | Kogan ............ 423/579 |
| 5,779,912 | A | * | 7/1998 | Gonzalez-Martin et al. ............ 422/186.3 |
| 5,862,449 | A | | 1/1999 | Bischoff et al. |
| 5,863,491 | A | * | 1/1999 | Wang ............ 266/101 |

(Continued)

FOREIGN PATENT DOCUMENTS

| GB | 2 310 865 A | 9/1997 |
| JP | A-09-241001 | 9/1997 |

(Continued)

OTHER PUBLICATIONS

Tanaka et al., "Present and Future Prospects of Hydrogen Production Process Constructed by the Combination of Photocatalytic $H_2O$ Splitting and Membrane Separation Process," *Membrane*, 2011, vol. 36, No. 3, pp. 113-121 (with English-language abstract).

(Continued)

*Primary Examiner* — Keith Hendricks
*Assistant Examiner* — Colleen M Raphael
(74) *Attorney, Agent, or Firm* — Oliff & Berridge, PLC

(57) ABSTRACT

The present invention provides a hydrogen generation device using a photocatalyst to generate hydrogen from liquid water or water vapor and a method of using the same. The hydrogen generation device of the present invention has a water channel through which liquid water or water vapor flows, and which has an outer circumferential wall made at least in part of a transparent material; a hydrogen channel through which hydrogen flows and which is located at the inner circumference side of the water channel; a hydrogen separating membrane forming at least part of a wall between the water channel and hydrogen channel, separating hydrogen from the liquid water or water vapor in the water channel, and providing the hydrogen to the hydrogen channel; and a photocatalyst layer arranged on least at part of the water channel-side surface of the hydrogen separating membrane.

9 Claims, 2 Drawing Sheets

U.S. PATENT DOCUMENTS

| | | | |
|---|---|---|---|
| 6,183,701 B1 * | 2/2001 | Sherman | 422/186.3 |
| 2005/0000792 A1 * | 1/2005 | Yamada et al. | 204/157.15 |
| 2006/0222575 A1 * | 10/2006 | Chen | 422/186 |
| 2007/0148084 A1 * | 6/2007 | Radhakrishnan et al. | 423/648.1 |
| 2008/0283121 A1 * | 11/2008 | Guerra | 204/660 |
| 2009/0321244 A1 * | 12/2009 | Smith et al. | 204/157.52 |

FOREIGN PATENT DOCUMENTS

| | | |
|---|---|---|
| JP | A-2001-146404 | 5/2001 |
| JP | A-2002-128512 | 5/2002 |
| JP | A-2004-008971 | 1/2004 |
| JP | A-2004-035356 | 2/2004 |
| JP | A-2004-149332 | 5/2004 |
| JP | A-2004-223435 | 8/2004 |
| JP | A-2004-292284 | 10/2004 |
| JP | A-2005-319383 | 11/2005 |
| JP | A-2006-290686 | 10/2006 |
| JP | A-2008-055295 | 3/2008 |
| JP | A-2008-207969 | 9/2008 |
| WO | WO 2010021551 A1 * | 2/2010 |

OTHER PUBLICATIONS

International Search Report in corresponding International Application No. PCT/JP2011/068635 (with English-language translation).

Nov. 8, 2011 Written Opinion of the International Searching Authority issued in International Application No. PCT/JP2011/068635 (with translation).

* cited by examiner

HYDROGEN GENERATION DEVICE AND METHOD OF USING SAME

TECHNICAL FIELD

The present invention relates to a hydrogen generation device using a photocatalyst to generate hydrogen from liquid water or water vapor. Further, the present invention relates to a method of using this hydrogen generation device to generate hydrogen.

BACKGROUND ART

In recent years, numerous proposals have been made for use of the clean energy hydrogen as a source of energy.

To produce hydrogen, steam reformation using a hydrocarbon fuel has been the general practice. In recent years, consideration has been given to obtaining hydrogen from water by water splitting, in particular the water splitting using solar energy. In particular, when generating hydrogen by splitting water, photocatalytic decomposition of water using solar energy is gathering attention in the point of enabling the utilization of the inexhaustible solar energy.

Regarding the separation of hydrogen from the mixture of hydrogen, oxygen, and water obtained by water splitting, Japanese Unexamined Patent Publication (Kokai) No. 2004-35356 and Japanese Unexamined Patent Publication (Kokai) No. 2004-292284 propose using a hydrogen separating membrane selectively allowing the passage of only hydrogen. Note that, Japanese Unexamined Patent Publication (Kokai) No. 2008-207969 proposes using a hydrogen separating membrane for separation of hydrogen from a mixed gas obtained by steam reformation using a hydrocarbon fuel.

SUMMARY OF INVENTION

The present invention provides a hydrogen generation device using a photocatalyst to generate hydrogen from liquid water or water vapor. Further, the present invention provides a method for using this hydrogen generation device to generate hydrogen.

The hydrogen generation device of the present invention has a water channel through which liquid water or water vapor flows, and which has an outer circumferential wall made at least in part of a transparent material; a hydrogen channel through which hydrogen flows, and which is located at the inner circumference side of the water channel; a hydrogen separating membrane forming at least part of a wall between the water channel and hydrogen channel, separating hydrogen from the liquid water or water vapor in the water channel, and providing the hydrogen to the hydrogen channel; and a photocatalyst layer arranged on least at part of the water channel-side surface of the hydrogen separating membrane.

DESCRIPTION OF EMBODIMENTS

The hydrogen generation device of the present invention is for generating hydrogen from liquid water or water vapor.

Figure 1:
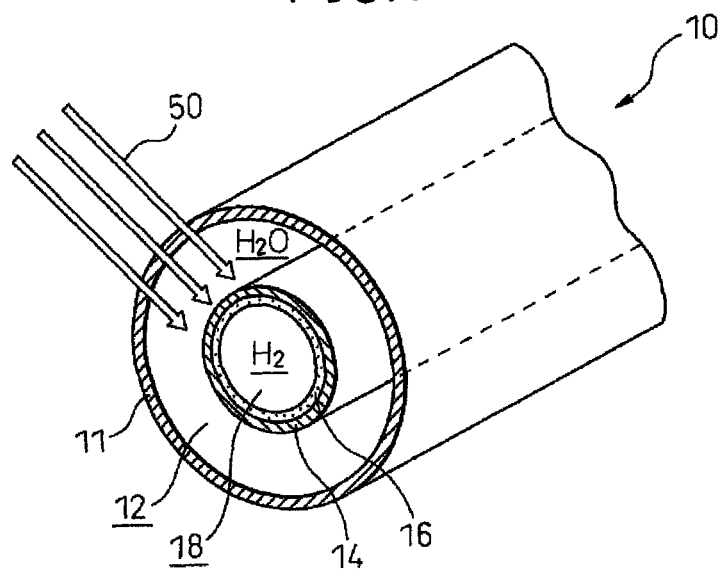
FIG. 1 is a view for explaining a hydrogen generation device of the present invention.

Specifically, for example, the hydrogen generation device of the present invention can have a structure such as shown in FIG. 1. In the aspect shown in this FIG. 1, the hydrogen generation device of the present invention has a water channel (12) through which liquid water or water vapor ($H_2O$) flows and which has an outer circumferential wall (11) made at least in part of a transparent material; a hydrogen channel (18) through which hydrogen ($H_2$) flows and which is located at the inner circumference side of the water channel (12); a hydrogen separating membrane (16) forming at least part of a wall between the water channel (12) and hydrogen channel (18), separating hydrogen from the liquid water or water vapor in the water channel (12), and providing the hydrogen to the hydrogen channel (18); and a photocatalyst layer (14) arranged on least at part of the water channel (12)—side surface of the hydrogen separating membrane (16).

In the use of the hydrogen generation device of the present invention, it is possible to supply the water channel (12) with the liquid water or water vapor, irradiate light, through the outer wall (11) of the water channel made of the transparent material, to strike the photocatalyst layer (14) and split the liquid water or water vapor to generate hydrogen and oxygen by the photocatalyst, separate the hydrogen from the water channel to supply the hydrogen to the hydrogen channel by the hydrogen separating membrane (16), and then obtain the generated hydrogen from the hydrogen channel.

According to the hydrogen generation device of the present invention, the hydrogen channel and hydrogen separating membrane are arranged at the inner circumference side of the water channel and photocatalyst layer, so the light irradiated through the outside wall of the water channel can be effectively utilized at the photocatalyst layer. In particular, according to the hydrogen generation device of the present invention, by supplying only the hydrogen among the generated hydrogen and oxygen to the hydrogen channel, it is possible to keep the hydrogen and oxygen from again bonding at the water channel and returning to water. Further, in particular, according to the hydrogen generation device of the present invention, when supplying liquid water to the water channel, it is possible to reduce bubbles of hydrogen in the liquid water and therefore effectively utilize the light irradiated through the outside wall of the water channel at the photocatalyst layer.

To achieve separation of hydrogen by the hydrogen generation device of the present invention, the pressure of the water channel is preferably made larger than the pressure of the hydrogen channel. The specific pressure depends on the operating temperature of the hydrogen generation device of the present invention, the separation performance and strength of the membrane used, etc., but, for example, the pressure of the water channel is preferably made 1 atmosphere or more and the pressure of the hydrogen channel is preferably made a pressure smaller than the pressure of the water channel.

Furthermore, after generating the hydrogen by the hydrogen generation device of the present invention, another device may be used to extract the oxygen and the remaining hydrogen from the product of the water channel. As the other device in this case, a container-type gas-liquid separation device utilizing gravity, centrifugal force, etc. may be mentioned. The product from the water channel after treatment by the gas-liquid separation apparatus in this way is substantially comprised of water, and therefore can be discarded and/or can be recycled to the hydrogen generation device of the present invention.

As the "hydrogen separating membrane" used in the present invention, it is possible to use any membrane enabling the preferential passage of hydrogen compared with oxygen. Here, the molar ratio ($H_2/O_2$) of the amount of passage of hydrogen and the amount of passage of oxygen may be, for example, at the operating temperature, 2 or more, 10 or more, 50 or more, 100 or more, or 1,000 or more.

As such a hydrogen separating membrane, many membranes are known. For example, Japanese Unexamined Patent Publication (Kokai) No. 2008-055295, Japanese Unexamined Patent Publication (Kokai) No. 2002-128512, Japanese Unexamined Patent Publication (Kokai) No. 2004-008971, Japanese Unexamined Patent Publication (Kokai) No. 2005-319383, Japanese Unexamined Patent Publication (Kokai) No. 2006-290686, etc. may be referred to.

Figure 2:
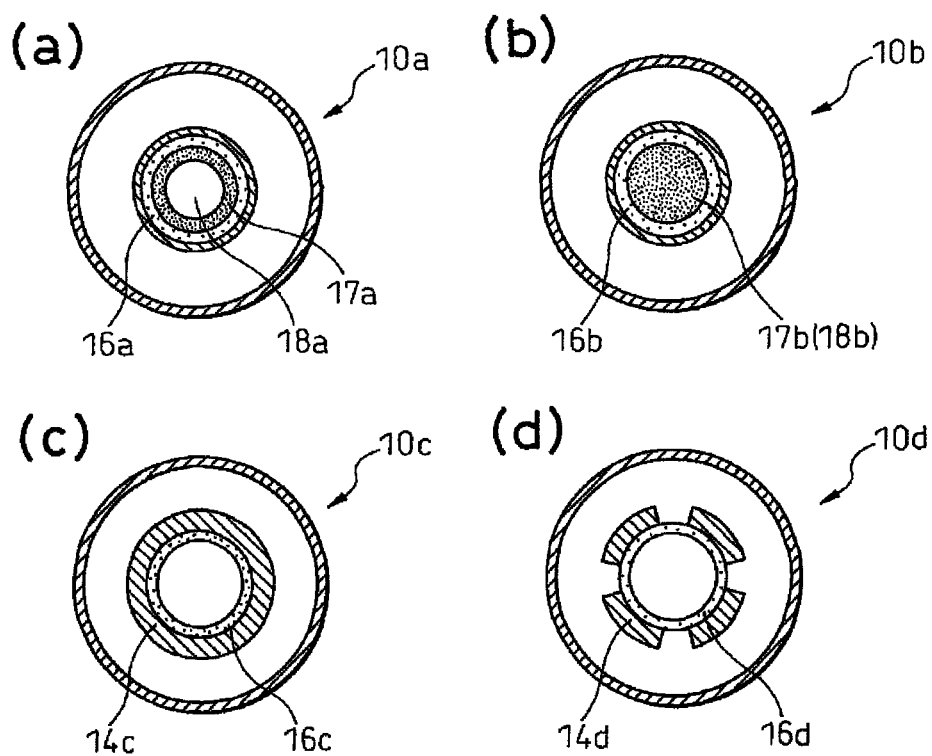
FIG. 2 is a view showing another aspect of a hydrogen generation device of the present invention.

Further, use of a porous ceramic body, metal mesh, or other gas-permeable support laminated with the hydrogen separating membrane is sometimes preferable in regard to strength. When using such a gas-permeable support, as shown in FIG. 2(a), in the hydrogen generation device of the present invention (10a), the gas-permeable support (17a) may support the hydrogen separating membrane (16a), and have a hydrogen channel (18a) located at its inner circumference side. Further, when using such a gas-permeable support, as shown in FIG. 2(b), in the hydrogen generation device of the present invention (10b), the gas-permeable support (17b) may support the hydrogen separating membrane (16b) and form a hydrogen channel (18b).

As the "photocatalyst layer" used in the present invention, any catalyst able to split water into hydrogen and oxygen by a photocatalytic reaction, for example, a titanium oxide catalyst, may be used. This photocatalyst layer may have any shape. Therefore, for example, as shown in FIG. 2(c), in the hydrogen generation device of the present invention (10c), the photocatalyst layer (14c) may be arranged on the entire water channel-side surface of the hydrogen separating membrane (16c). Further, for example, as shown FIG. 2(d), in hydrogen generation device of the present invention (10d), the photocatalyst layer (14d) may also be arranged on only part of the water channel-side surface of the hydrogen separating membrane (16d). Still further, for example, the photocatalyst layer may have a concave-convex surface to improve contact with the liquid water or water vapor in the water channel.

The hydrogen generation device of the present invention may further have a solar light focusing member for focusing solar light on the photocatalyst layer. According to a hydrogen generation device of the present invention further having such a solar light focusing member, it is possible to promote the efficient utilization of solar energy for the generation of hydrogen.

As the solar light focusing member in this case, a parabolic dish-type light focusing member, solar tower-type light focusing member, or parabolic trough-type light focusing member may be used. Specifically, a parabolic dish-type light focusing member is a solar light focusing member having a dish shaped reflecting part reflecting and focusing solar light, and a light receiving part receiving the focused light. It has a high light focusing degree, and therefore can give a high temperature heat source, but is relatively high in cost. Further, a solar tower-type light focusing member is a solar light focusing member having a plurality of heliostats (reflecting part) for reflecting and focusing solar light, and a light receiving part arranged at the top of the light receiving tower. It has a large light focusing degree, and therefore can give a high temperature heat source, but the construction cost of the tower is high and control of the reflecting mirrors requires advance technology. Still further, a parabolic trough-type light focusing member is a solar light focusing member having a trough-type reflecting part reflecting and focusing solar light, and a light receiving part receiving the focused light. It has a low light focusing degree, and therefore provides a low temperature heat source. These light focusing members may have reflecting parts covered by aluminum or another reflective material.

Figure 3:
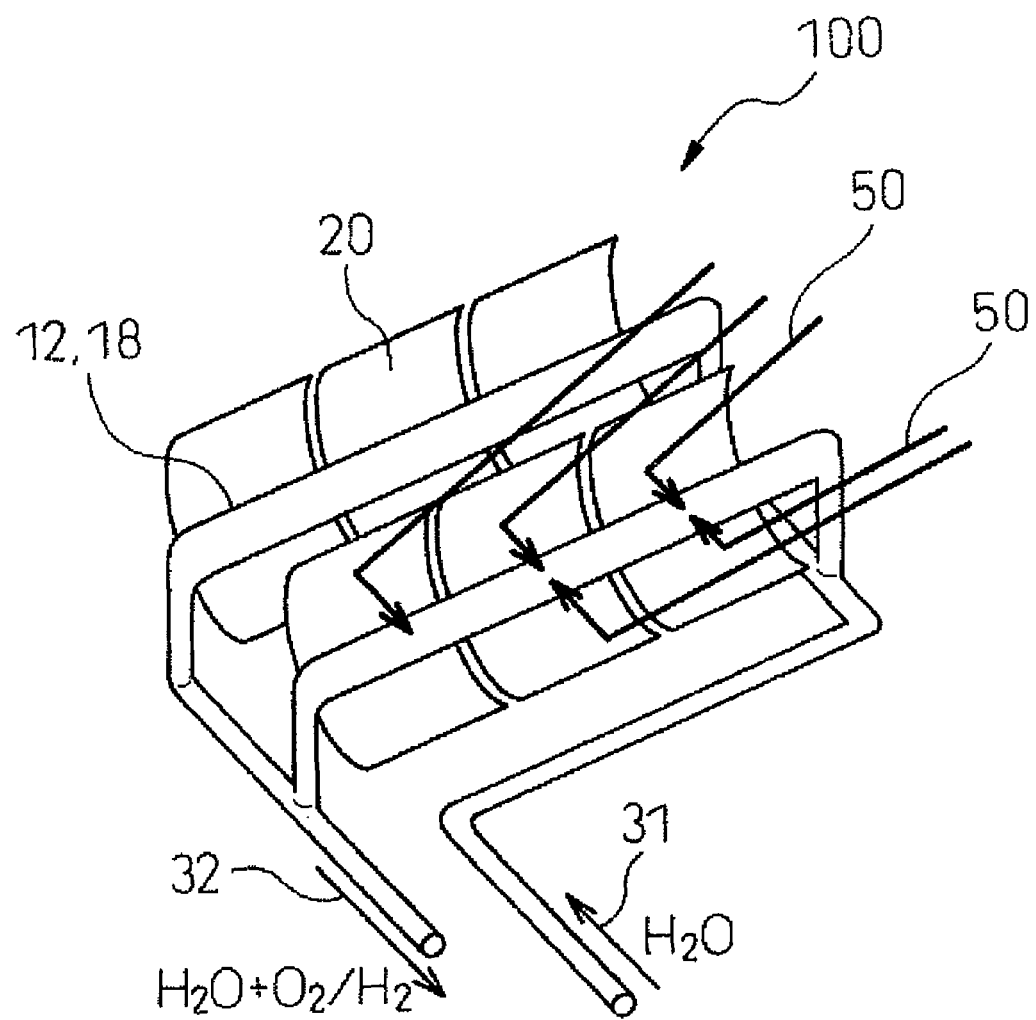
FIG. 3 is a view showing an example of a light focusing member able to be used for the hydrogen generation device of the present invention.

A hydrogen generation device of the present invention further having such a solar light focusing member may also be one as shown in for example FIG. 3.

The hydrogen generation device (100) shown in FIG. 3 has a parabolic trough-type light focusing member (20). At the light focused part of this parabolic trough-type light focusing member 20, the hydrogen channel (12), water channel (18), etc. of the hydrogen generation device are arranged. In the hydrogen generation device (100) shown in FIG. 3, by arranging the hydrogen channel (12), water channel (18), etc. of the hydrogen generation device at the light focused part of the light focusing member (20) in this way, solar light (50) is focused on the photocatalyst (14) of the hydrogen generation device of the present invention.

In this hydrogen generation device (100), the channels do not have to be straight. To obtain the necessary channel lengths, they may also be made snaking.

In the use of this hydrogen generation device (100), water ($H_2O$), as shown by the arrow (31), is supplied to the water channel (12), at least part of the supplied water is split into hydrogen and oxygen by a photocatalytic reaction, and the hydrogen is recovered at the hydrogen channel (18). After this, the water not used for the reaction and the oxygen accompanied with the water ($H_2O+O_2$), and the hydrogen ($H_2$) are, as shown by the arrow (32), recovered by the water channel (12) and hydrogen channel (18), respectively, from the hydrogen generation device of the present invention (100).

The invention claimed is:

1. A hydrogen generation device comprising:
    a water channel through which liquid water or water vapor flows, and which has an inner circumference side and an outer circumferential wall made at least in part of a transparent material;
    a hydrogen channel through which hydrogen flows, and which is located at the inner circumference side of the water channel;
    a hydrogen separating membrane forming at least part of a wall between the water channel and the hydrogen channel, separating hydrogen from the liquid water or water vapor in the water channel, and providing the hydrogen to the hydrogen channel; and
    a photocatalyst layer arranged on at least part of an outer surface of the hydrogen separating membrane.

2. A hydrogen generation device according to claim 1, wherein the pressure of said water channel is larger than that of said hydrogen channel.

3. A hydrogen generation device according to claim 2, wherein said hydrogen generation device further comprises a solar light focusing member which focuses solar light at said photocatalyst layer.

4. A method for generating hydrogen by using a hydrogen generation device according to claim 3, comprising:
    supplying said water channel with said liquid water or water vapor,
    irradiating light, through an outer wall of said water channel made of said transparent material, to strike said photocatalyst layer, and splitting the liquid water or water vapor to generate hydrogen and oxygen by said photocatalyst, separating said hydrogen from said liquid water or water vapor in said water channel to supply hydrogen to said hydrogen channel by using said hydrogen separating membrane, and obtaining the generated hydrogen from said hydrogen channel.

5. A method for generating hydrogen by using a hydrogen generation device according to claim 2, comprising:

supplying said water channel with said liquid water or water vapor, irradiating light, through an outer wall of said water channel made of said transparent material, to strike said photocatalyst layer, and splitting the liquid water or water vapor to generate hydrogen and oxygen by said photocatalyst, separating said hydrogen from said liquid water or water vapor in said water channel to supply hydrogen to said hydrogen channel by using said hydrogen separating membrane, and obtaining the generated hydrogen from said hydrogen channel.

6. A hydrogen generation device according to claim 1, wherein said hydrogen generation device further comprises a solar light focusing member which focuses solar light at said photocatalyst layer.

7. A method for generating hydrogen by using a hydrogen generation device according to claim 6, comprising:

supplying said water channel with said liquid water or water vapor, irradiating light, through an outer wall of said water channel made of said transparent material, to strike said photocatalyst layer, and splitting the liquid water or water vapor to generate hydrogen and oxygen by said photocatalyst, separating said hydrogen from said liquid water or water vapor in said water channel to supply hydrogen to said hydrogen channel by using said hydrogen separating membrane, and obtaining the generated hydrogen from said hydrogen channel.

8. A method for generating hydrogen by using a hydrogen generation device according to claim 1, comprising:

supplying said water channel with said liquid water or water vapor, irradiating light, through an outer wall of said water channel made of said transparent material, to strike said photocatalyst layer, and splitting the liquid water or water vapor to generate hydrogen and oxygen by said photocatalyst, separating said hydrogen from said liquid water or water vapor in said water channel to supply hydrogen to said hydrogen channel by using said hydrogen separating membrane, and obtaining the generated hydrogen from said hydrogen channel.

9. A hydrogen generation device according to claim 1, wherein the water or water vapor is split by a photocatalyst of the photocatalyst layer to generate hydrogen and oxygen, and only the generated hydrogen from the generated hydrogen and oxygen is provided to the hydrogen channel.

* * * * *